Patented Mar. 5, 1946

2,395,853

UNITED STATES PATENT OFFICE 2,395,853

BITUMINOUS PAINT COMPOSITION

William F. Fair, Jr., Pittsburgh, Pa., assignor, by mesne assignments, to Koppers Company, Inc., a corporation of Delaware No Drawing. Application May 18, 1943, Serial No. 487,531

5 Claims. (Cl. 106—280)

This invention relates to improvements in coating compositions. The said compositions find application as a touch-up paint or dope and for coating fibrous or wooden, metal, or stone, or other surfaces and particularly such surfaces that have been precoated with bituminous coatings and for exposure to the weather.

The present invention comprises an improved bituminous paint that is easily applied and that will readily flow over all the contours of a surface, filling rough areas, and subsequently setting as a continuous film that is non-flowing, and does not peel, crack or crumble even after long exposure to varying atmospheric conditions. This paint includes a particular improved pitch, and a compatible solvent substantially completely or predominantly aromatic, and having a predetermined volatility.

The improved pitch, employed as a base in the paint, comprises a heat-liquefiable bituminous medium in which coal is dispersed by controlled digestion and which is composed of, or contains, heavy water gas tar heavy oil, or to which heavy water gas tar heavy oil is added during or after the digestion and dispersion process, or during or after thermal decomposition of coal in such process. In the production of a coal-digestion pitch for paint purposes, though other tars and pitches may be used, particularly advantageous is the use of heavy water gas tar or a pitch residue derived from the distillation of heavy water gas tar. The heavy water gas tar heavy oil, or high boiling distillate, which is included in the coal-digestion pitch, is employed as an agent for highly effectively lowering the susceptibility of the viscosity of the pitch to change with temperature. Thus, a bituminous paint film is obtainable having improved rheological properties, exhibiting more desirable non-flow as well as other properties at higher temperatures, and less tendency toward embrittlement at lower temperatures. The above characteristics are important in a black paint and are not ordinarily readily obtainable in conventionally produced pitches.

Heavy water gas tar, referred to above, is obtained from water-gas generator plants in which Bunker-C or similar grades of residual petroleum fuel oil are used for carbureting. This tar, though produced from a petroleum raw material, is composed mostly of aromatic constituents. Heavy water gas tar should be differentiated from what is known as water gas tar or light water gas tar which is produced in the carbureter of a water gas plant when petroleum distillates are used as carbureting materials. In certain industrial groups heavy water gas tar is termed residiuum tar to distinguish it from what was formerly known as water gas tar or is known today as light water gas tar. Other heat-liquefiable bitumens including tars and pitches, either singly or combinations thereof, may be added to the heavy water gas tar, or may be substituted in whole or in part for the latter. Such other bitumens in addition to heavy water gas tar are, for example, coal tar (from high or low temperature coking processes), light water-gas tar, oil-gas tar, Pintsch gas tar and wood tar, and the corresponding pitches derived from the above-mentioned tars.

Heavy water gas tar heavy oil, referred to above, is obtained by distilling heavy water gas tar and separating the distillate recoverable above approximately 300° C. during the increasing temperature interval when samples of the distillation pitch residue increase in softening point from approximately 95° C. to approximately 150° C., as measured by the A. S. T. M. standard ring and ball softening point test. The boiling points may be within the approximate range of 250° C. to 450° C. Only a minor portion of said oil thus prepared will boil below 300° C. Typical distillation results obtained at atmospheric pressure for a sample of heavy water gas tar heavy oil so prepared are given in the following table:

| Temperature | Per cent distillate |
|---|---|
| 270° C | 3.9 |
| 300° C | 15.8 |
| 355° C | 68.9 |
| 375° C | 82.6 |
| 400° C | 92.9 |

In one procedure for obtaining the improved paint base, coal and tar pitch or heated together and, while stirring the mixture, the temperature thereof is gradually increased over an extended period of time to substantially 300° C. or preferably to a temperature in the approximate range of 300° C. to 310° C. Any distillate obtained is discarded. The heated material is then fluxed to any required softening point with heavy water gas tar heavy oil. The addition of the heavy oil after digestion of the coal results in the formation of a pitch vastly superior in rheological properties as compared with one prepared with heavy oil added to the initial digestion medium.

In such latter procedure, coal, and tar or pitch, and heavy water gas tar heavy oil are initially thoroughly mixed, heated together, and while mixing, the temperature is gradually raised over a period of time to obtain a product having a desired softening point. In another procedure, though not as desirable as those indicated above, coal is dispersed in heavy water gas tar heavy oil, and tar or pitch are then added while heating and stirring. During or after a period of gradually increasing temperature, depending upon the proportions of materials originally combined, additional quantities of pitch or tar or heavy water gas tar heavy oil, or combinations of these are added as necessary to obtain a product having any desired softening point. Though coal-digestion pitches are obtainable with ring and ball softening points in the approximate range of 35° C. to 150° C. and with improved rheological properties, for paint products the softening points are preferably at least about 75° C. with high penetrations at low temperatures, such as, a penetration of at least 10 at 32° F., and preferably not over 70 at 115° F. Softening points and penetrations are determined herein by methods prescribed by the American Society for Testing Materials.

The above processes are varied depending upon the coal and tar or pitch used and upon the nature of the product to be obtained. The coal is a bituminous coal such as, coking coals including either high or low volatile bituminous coal, and certain commercial non-coking bituminous coals.

In the preparation of the digested coal product, the ingredients are placed in a still or digesting tank provided with or without mechanical stirrers or other means of agitation and provided with heating means. In large scale production a still, provided with heating tubes positioned so as to distribute heat uniformly throughout a batch, may be used. The rate of rise in temperature of the heating vessel in the initial stages at least is preferably low to permit the evaporation of any water present which might cause excessive foaming. The coal used may be preferably initially dehydrated which is best accomplished by finely dividing it and then subjecting it to a drying treatment. By proper division of the coal to a finely pulverized condition more uniform distribution thereof in the liquid media is readily attained. Coking of the material or too rapid decomposition of constituents therein, particularly where the higher concentrations of coal are employed, is avoided by maintaining moderate rates of temperature rise.

The temperature at which coal and a bituminous medium are heated together to provide the protective coating of the present invention should not be lower than that at which a satisfactory dispersion is obtained within a reasonable time from a practical standpoint, namely, substantially 270° C., and the temperature should not be permitted to rise so high as to decrease unduly the life of the heating equipment, namely, approximately 350° C.

In adjusting the characteristics of the final coating material, it is noted that generally the increase in proportion of coal results in more pronounced departure from simple viscous flow properties, and in increased softening points of the products. The greater the proportion of dispersed coal, the harder the final product, and the greater the proportion of admixed heavy water gas tar heavy oil, the softer the product and the greater the improvement in temperature susceptibility. The greater the proportion of the coal and heavy water gas tar heavy oil as distinct from tar or pitch, the better the improvements in viscosity-temperature susceptibility and the greater the resistance to flow under stress. The addition of heavy water gas tar heavy oil alone to a bitumen such as coal tar pitch as well as to coal and tar or oil mixtures, and the uniform distribution of the heavy water gas tar heavy oil therein, result in a homogeneous product having a relatively lower viscosity susceptibility to temperature changes than does the original bitumen.

It is found that in the preparation of the products claimed, protective coatings with the desired characteristics may be duplicated by adjustment of the proportions of coal, dispersing media and heavy water gas tar heavy oil; by control of heating temperatures; by addition of dispersing media and/or heavy water gas tar heavy oil to a batch under treatment at predetermined stages in the coal digestion process and at predetermined rates; by adjustment of the length of time of mixing and heating given proportions of the ingredients and of the manner of mixing same; and, if desired, by alternative treatments of the coal dispersion product with dehydrogenating agents such as sulfur, and/or air or oxygen-containing gases, or by vacuum distillation of the coal dispersion product and subsequent addition of heavy water gas tar heavy oil, thereby replacing lower boiling oils by the higher boiling heavy water gas tar heavy oil.

By way of illustrating, more specifically, the preparation of a suitable coal-digestion pitch, one such pitch is made as follows: About 187 parts by weight of heavy water gas tar and about 47 parts by weight of powdered bituminous coal are heated together in a still preferably while stirring. The temperature is gradually raised to a temperature of about 305° C. over a period of approximately five and one-half hours. This temperature is maintained for about four hours during which time there results a distillate of about 5 to 6% based on the tar. At the end of this time heating is discontinued and the mixture permitted to cool. After about forty minutes and while the temperature is slowly dropping, about 54 parts by weight of heavy water gas tar heavy oil are stirred into the heat-treated coal and tar mass. The resulting product is discharged from the still at around 225° C. The softening point of this product is about 102° C., and the penetration at 32° F., 200 grams, 60 seconds, is 14; at 77° F., 100 grams, 5 seconds, is 20.5; and at 115° F., 50 grams, 5 seconds, is 40.

Another such pitch is made as follows: A still is charged with about 60 parts by weight of heavy water gas tar heavy oil to which about 37.5 parts by weight of powdered coking coal are added, and then about 52.5 parts by weight of coke oven tar pitch, while stirring and heating. The charge is preferably heated slowly to a temperature of about 300° to 310° C. This range is reached in about two and one-half hours and is substantially maintained for about five hours. The temperature of the charge at the end of another hour is reduced to about 245° C. and about 22 parts by weight of heavy water gas tar heavy oil added while stirring. At two successive intervals thereafter of about thirty minutes apart, about 10 parts by weight of coke oven pitch are added while stirring. The product is discharged from the still and is ready for use. Its softening point is about 104° C. and the penetration at 32° F., 200 grams, 60 seconds, is 15; at 77° F., 100 grams, 5 seconds, is 25; and at 115° F., 50 grams, 5 seconds, is 40.

Still another such pitch is prepared as follows: A mixture prepared from approximately 174 parts by weight of coke oven tar and approximately 58 parts by weight of pulverized bituminous coal is heated to about 300° C., over a period of seven to eight hours. The heating is discontinued and about 72 parts by weight of heavy water gas tar heavy oil are added whereupon the heating is resumed at about 300° C. for an additional one to two hours. Then another 15 parts by weight of heavy water gas tar heavy oil are added whereafter the heating is discontinued and after thorough mixing the product is permitted to cool. The softening point of the product is about 89° C. and the penetration at 32° F., 200 grams, 60 seconds, is 24; at 77° F., 100 grams, 5 seconds, is 38; and at 115° F., 50 grams, 5 seconds, is 67.

A specific example of an improved coal-digestion pitch is one prepared by bringing together about 15,000 pounds of pulverized bituminous coal, about 4770 gallons of heavy water gas tar and about 500 gallons of heavy water gas tar heavy oil, and heating the mixture to a temperature in the range of approximately 300 to 310° C. within a period of eight to twelve hours. The heating in this range is continued for an additional two hours. Then the heating is discontinued whereupon approximately 1500 gallons of heavy water gas tar heavy oil are thoroughly mixed into the heated mixture. The product when cooled and solidified has a softening point of about 118° C., and penetrations at 32° F. of 19; at 77° F. of 30; and at 115° F. of 48.

In some cases one to two parts by weight of sulfur may be included in a coal-digestion mixture, or air may be introduced for varying periods. The air and sulfur serve as dehydrogenating agents by which with subsequent addition of heavy water gas tar heavy oil, the characteristics of the pitch may alternatively be adjusted.

Though the proportions of heavy oil in the above procedures are specifically stated, usually the heavy oil content may be varied in the range of approximately 15% to aapproximately 40%. The coal content may vary in the range of approximately 10% to approximately 30%. These ranges may not apply in every instance but serve merely for illustration purposes.

A preferred method of preparing a paint is to add a low-boiling solvent, such as coal tar naphtha, at room temperature, slowly to the molten coal-digestion pitch with agitation. The agitation is continued until all the solvent has been introduced, and the final mixture has dropped to a temperature suitable for packaging.

Solvent naphtha in the above procedure may in whole or in part be replaced by other low-boiling coal tar solvents; fractions of heavy water gas tar and of light water gas tar distillates; and petroleum distillates of high aromaticity or containing a preponderating proportion of aromatics. The boiling point ranges of these solvents may be from about 100° C., or 135° C., or from 150° C. to about 200° C., depending upon the drying properties desired. The boiling points may also range higher than 200 C., as shown in the following table, depending upon the use of the paint:

*Distillation of typical solvents*

| Sample source | (1) Coal tar | (2) Coal tar | (3) Heavy W. G. tar | (4) Light W. G. tar |
|---|---|---|---|---|
| | °C. | °C. | °C. | °C. |
| First drop | 105 | 145 | 140 | 148 |
| 5% | 127 | 160 | 153 | 175 |
| 10% | 138 | 165 | 163 | 187 |
| 20% | 148 | 169 | 173 | 201 |
| 30% | 157 | 171 | 182 | 209 |
| 40% | 164 | 174 | 191 | 218 |
| 50% | 168 | 176 | 203 | 225 |
| 60% | 173 | 177 | 207 | 228 |
| 70% | 175 | 179 | 216 | 233 |
| 80% | 179 | 182 | 225 | 241 |
| 90% | 184 | 188 | 242 | 258 |
| 95% | 195 | 198 | 258 | 280 |

If relatively quick drying products are desired, the lower boiling solvents of any of the sources mentioned may be selected for use, but if slower setting paints are required the higher boiling fractions are selected for incorporation in the paint. In the above table, solvents (1) and (2) provide a relatively quick drying paint; (3) provides a slightly slower drying paint; and (4) a considerably slower drying paint. For most paint purposes, solvents distilling up to about 200° C. are preferred.

Coal tar solvent naphtha, when employed in the paint, is prepared from coal tar distillate from which most of the tar acids, and in some instances the tar bases, have been removed. Material boiling below 100° C. is preferably removed to prevent too rapid setting of the paint upon application, and to minimize fire hazards arising from too low boiling distillates if present. Coal tar solvents and solvents of high aromaticity are particularly compatible with coal-digestion pitches and prevent undesirable sludging and separation of different ingredients into layers.

The proportion of these solvents to be used in the paint depends upon the desired consistency of the product. A relatively viscous product, suitable preferably for warm weather or warm climate use, and better for daubing, rather than brush painting, is made from a mix of approximately 80% by weight of coal-digestion pitch (softening point about 75° C. to about 125° C.), and 20% by weight of a selected solvent. A more fluid touch-up paint or dope, suitable for easy application in warm weather or warm climates is made with about 75% by weight of such coal-digestion pitch and 25% by weight of a selected solvent. A product fluid enough (specific Engler viscosity, 50 c. c. at 50° C., of approximately 18) for convenient application at low to moderate temperatures is made with about 70% by weight of such coal-digestion pitch and 30% by weight of a selected solvent.

A very fluid paint for conventional brush or spray application is made with 60 parts by weight of coal-digestion pitch (softening point about 75° C to about 125° C.) and about 40 parts by weight of a selected solvent (boiling range 100° C. to 200° C.). The specific Engler viscosity of such a paint is approximately 5 (50 c. c. at 50° C.).

A fluid paint generally suitable for brush or spray application to pitch coated articles, is made by cutting back 60 parts to 55 parts by weight of molten coal-digestion pitch of relatively high melting point with 40 to 45 parts by weight of aromatic solvent (boiling range about 100° to 200° C.), thus producing an adhesive, quick drying bituminous paint, that is applied cold, and having an Engler specific viscosity of approximately 8 to 15 (50 c. c. at 25° C.).

Fillers, such as, slate dust or flour, finely divided talc or clay may be added to the paint, if desired, to the extent of 25 to 30%, or even up to 35% to provide a desired adhesive weather-resistant film or coating.

The paints of the present invention find a wide use for covering, nails, staples, clips, bolts, nuts, fastenings, etc., used for holding in place metal articles used in roofing and sidings. They are used for repairing, without heating, coated sheets that have been scratched, damaged, or surface-marred, during stock-piling, loading, shipping or erecting in service positions.

Many paints do not adhere well to a bituminous paint surface, others bleed through or loosen an under coating of pitch, while others deteriorate upon exposure and present an undesirable appearance upon aging. The products of the present invention assure a homogeneous bonding with pitch coated articles giving superior weather protection. As a touch-up dope, the solvent softens slightly the pitch coating at the point of application, and then evaporates, leaving the paint pitch base adhering firmly to the original pitch coating which combined with the improved pitch base provide a uniform, integral coating resistant to atmospheric corrosion.

When the paint is applied to nails, clips, nuts, bolts, etc., for holding precoated metal sheets or other articles in place, a strong bonding action also takes place, leaving a weather exposed surface uniformly and integrally coated with a weather resistant bituminous film, which will not become brittle in cold weather, nor tend to flow at summer temperatures.

What is claimed is:

1. A bituminous paint composition comprising a bituminous base material having in combination a softening point of at least 75° C., a penetration of at least 10 at 32° F. with 200 grams for 60 seconds and of not over 70 at 115° F. with 50 grams for 5 seconds, obtainable by heating a digestion medium containing heat-liquefiable tar and pitch constituents with approximately 10% to approximately 30% of bituminous coal to a temperature approximately in the range of 300° to 310° C., and by dispersing in the coal and digestion medium product a heavy water gas tar heavy oil having a boiling point range of about 250° C. to 450° C. in the proportion of approximately 15% to approximately 40% by weight, and said base material having admixed therewith a low-boiling solvent preponderantly aromatic having a boiling range below 280° C., and in sufficient amount to render the composition of brushable and sprayable consistency, and the said paint when dry resulting in a residue that is non-flowing and non-cracking under atmospheric conditions.

2. A "coal-digesting pitch" paint with volatilizable vehicle and a base constituted of coal-digestion pitch containing approximately 15% to approximately 40% heavy water gas tar heavy oil for rendering an applied coating of the paint non-flowing and non-cracking when obtained as a residue after evaporation of said vehicle and under atmospheric conditions, the said vehicle consisting of a hydrocarbon solvent having a preponderating proportion of aromatic constituents and said coal-digestion pitch being obtainable by heating a mixture of bituminous coal and a heat-liquefiable bitumen to a temperature approximately in the range of 300° C. to 310° C. and by distributing therein said heavy water gas tar heavy oil forming a homogeneous blend having in combination a softening point of at least 75° C., and a penetration of at least 10 at 32° F. with 200 grams for 60 seconds and of not over 70 at 115° F. with 50 grams for 5 seconds.

3. A "coal-digestion pitch" paint with volatilizable vehicle and a base constituted of coal-digestion pitch containing approximately 15% to approximately 40% heavy water gas tar heavy oil for rendering an applied coating of the paint non-flowing and non-cracking when obtained as a residue after evaporation of said vehicle and under atmospheric conditions, the said vehicle consisting of a petroleum distillate having a preponderating proportion of aromatic constituents and said coal-digestion pitch being obtainable by heating a mixture of bituminous coal and a heat-liquefiable bitumen to a temperature approximately in the range of 300° C. to 310° C. and by distributing therein said heavy water gas tar heavy oil forming a homogeneous blend having in combination a softening point of at least 75° C., and a penetration of at least 10 at 32° F. with 200 grams for 60 seconds and of not over 70 at 115° F. with 50 grams for 5 seconds.

4. A "coal-digestion pitch" paint with volatilizable vehicle, finely divided filler, and a base constituted of coal-digestion pitch containing approximately 15% to approximately 40% heavy water gas tar heavy oil for rendering an applied coating of the paint non-flowing and non-cracking when obtained as a residue after evaporation of said vehicle and under atmospheric conditions, the said vehicle consisting of a hydrocarbon solvent having a preponderating proportion of aromatic constituents and said coal-digestion pitch being obtainable by heating a mixture of bituminous coal and a heat-liquefiable bitumen to a temperature approximately in the range of 300° C. to 310° C. and by distributing therein said heavy water gas tar heavy oil forming a homogeneous blend having in combination a softening point of at least 75° C., and a penetration of at least 10 at 32° F. with 200 grams for 60 seconds and of not over 70 at 115° F. with 50 grams for 5 seconds.

5. A bituminous paint composition comprising a bituminous base material having in combination a softening point of at least 75° C., a penetration of at least 10 at 32° F. with 200 grams for 60 seconds and of not over 70 at 115° F. with 50 grams for 5 seconds, obtainable by heating a digestion medium containing heavy water-gas tar with bituminous coal to a temperature approximately in the range of 300° to 310° C., and by dispersing in the coal and digestion medium product a heavy water gas tar heavy oil having a boiling point range of about 250° C. to 450° C in the proportion of approximately 15% to approximately 40% by weight, and said base material having admixed therewith a low-boiling solvent preponderantly aromatic having a boiling range below 280° C. and in sufficient amount to render the composition of brushable and sprayable consistency, and the said paint when dry resulting in a residue that is non-flowing and non-cracking under atmospheric conditions.

WILLIAM F. FAIR, Jr.